United States Patent [19]

Corkill et al.

[11] Patent Number: 5,277,320
[45] Date of Patent: Jan. 11, 1994

[54] SHELL EGG CULLING SYSTEM

[75] Inventors: Duane E. Corkill; Norman B. Guy, Jr., both of Topeka

[73] Assignee: Seymour, Inc., Topeka, Kans.

[21] Appl. No.: 822,744

[22] Filed: Jan. 21, 1992

[51] Int. Cl.$^5$ .............................. A01K 43/04
[52] U.S. Cl. .................... 209/511; 209/587; 209/643; 209/698; 209/701; 209/939; 356/237; 250/563; 250/223 R
[58] Field of Search ............... 209/510, 511, 587, 629, 209/643, 698, 701, 939, 556, 558; 356/237, 240, 430, 394; 250/562, 563, 572, 223

[56] References Cited

U.S. PATENT DOCUMENTS

| | | | |
|---|---|---|---|
| 3,278,025 | 10/1966 | Willsey et al. | 209/511 |
| 4,321,864 | 3/1982 | Willsey | 99/500 |
| 4,376,951 | 3/1983 | Miyazawa | 356/237 X |
| 4,775,051 | 10/1988 | van der Schoot | 209/510 |
| 4,805,778 | 2/1989 | Nambu | 209/510 X |
| 4,831,922 | 5/1989 | Cogan et al. | 356/237 X |
| 4,872,564 | 10/1989 | van der Schoot | 209/511 |
| 4,915,237 | 4/1990 | Chang et al. | 209/526 X |
| 4,955,728 | 9/1990 | Hebrank | 209/511 X |
| 5,017,003 | 5/1991 | Keromnes et al. | 356/53 |
| 5,030,001 | 7/1991 | vande Vis | 250/223 X |
| 5,072,822 | 12/1991 | Smith | 198/465.4 X |

FOREIGN PATENT DOCUMENTS

| | | | |
|---|---|---|---|
| 0236665 | 6/1986 | Fed. Rep. of Germany | 209/510 |
| 0173157 | 8/1986 | Japan | 356/52 |
| 8302209 | 1/1985 | Netherlands | 209/510 |
| 1230924 | 5/1986 | U.S.S.R. | 209/510 |
| 2187277 | 9/1987 | United Kingdom | 209/511 |
| 2226130 | 6/1990 | United Kingdom | 250/223 |

Primary Examiner—H. Grant Skaggs
Assistant Examiner—Carol Lynn Druzbick
Attorney, Agent, or Firm—Litman, McMahon & Brown

[57] ABSTRACT

An improved shell egg culling system includes a conveying system having sites for conveying shell eggs, an illuminator together with a video camera in conjunction with a computer having a first algorithm and a second algorithm for determining which of the sites contain shell eggs having broken shells and which contain shell eggs having soiled shells, a plurality of bridges in side-by-side relationship which are controlled by the computer to remove shell eggs having broken shells from the conveying system for discarding, and a platform having a plurality of downwardly directed, suction-activated lifters which are controlled by the computer to remove shell eggs having soiled shells from the conveying system for recycling through a washer.

20 Claims, 3 Drawing Sheets

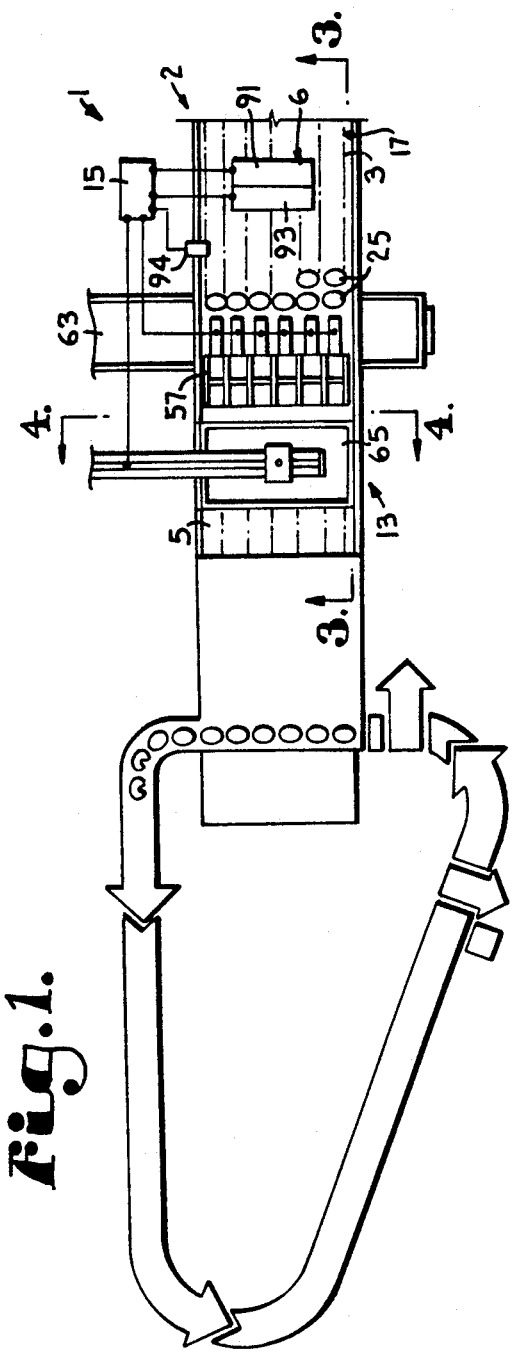
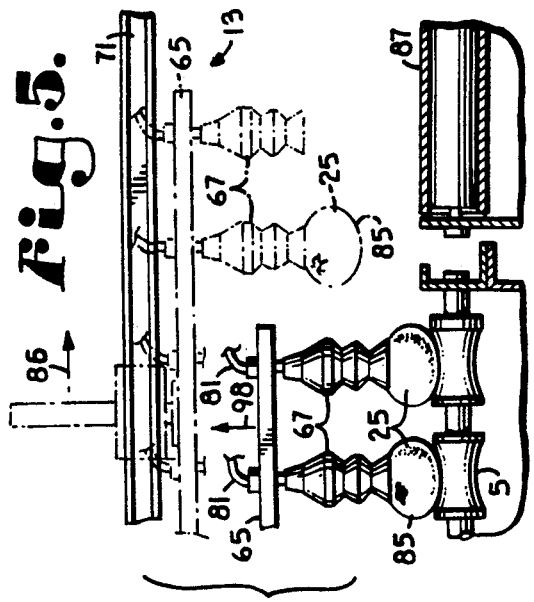
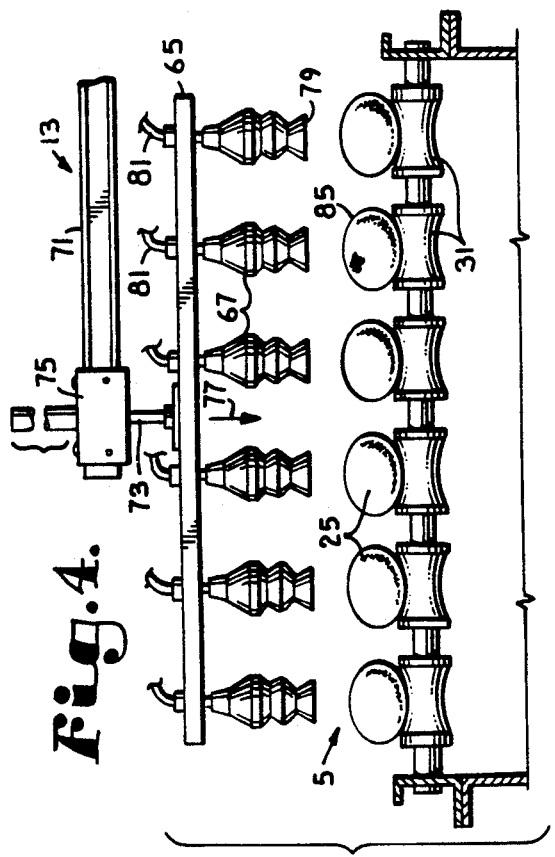

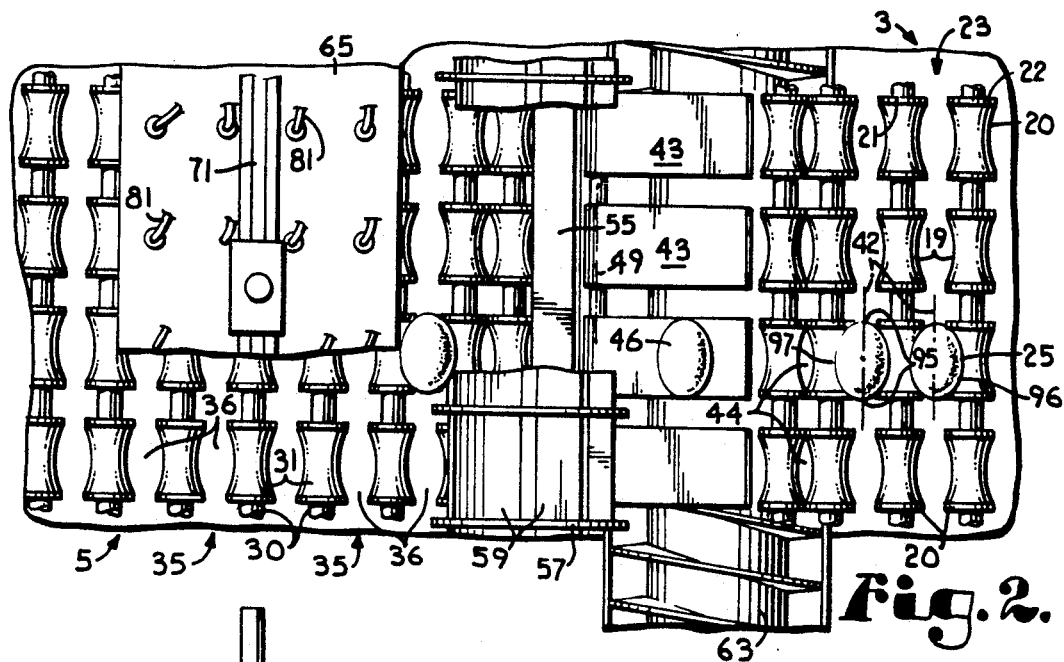
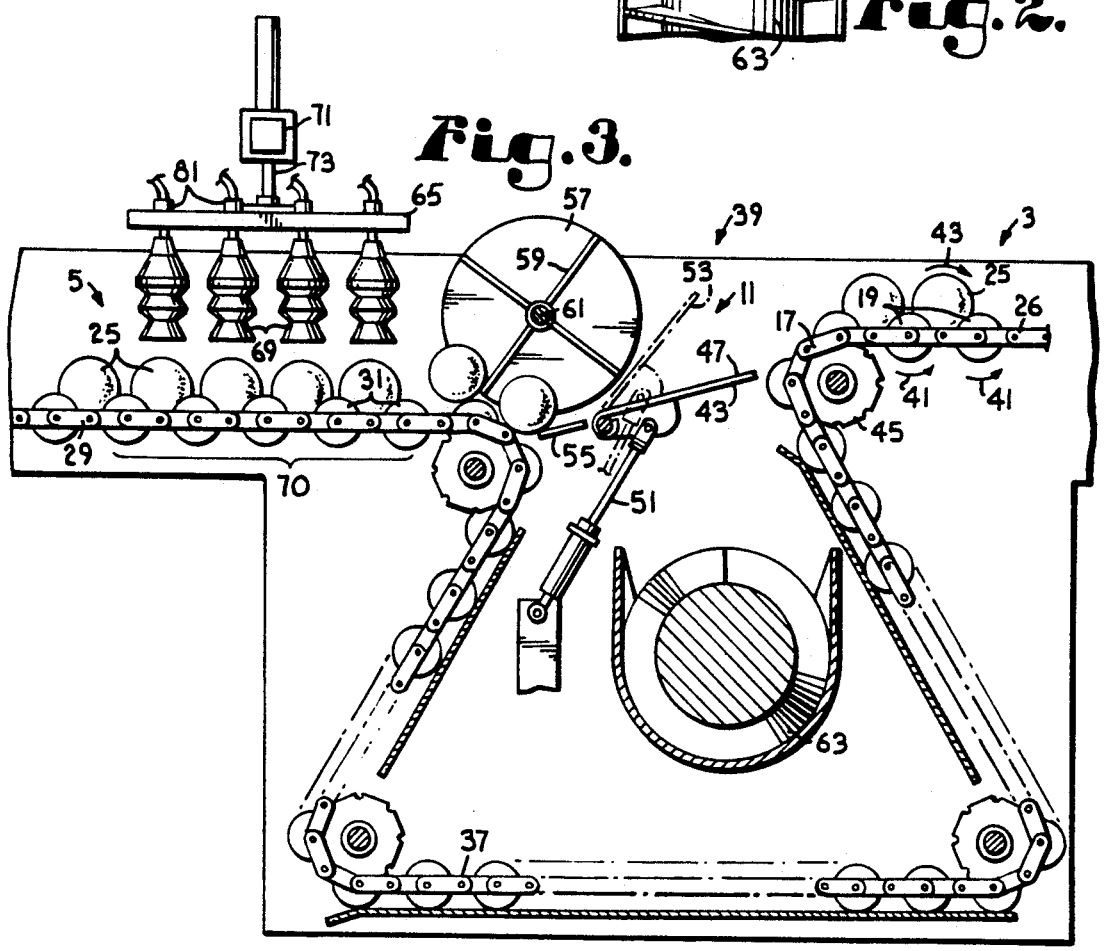

SHELL EGG CULLING SYSTEM

BACKGROUND OF THE INVENTION

1. Field of the Invention.

The present invention relates generally to an automatic culling system and, particularly, without limitation, to a video controlled system for automatically detecting and culling shell eggs having broken shells and shell eggs having soiled shells from shell eggs having clean, unbroken shells.

2. Description of the Related Art.

Inspection and sorting procedures are common for many types of products and in many different manufacturing and processing operations. For example, egg processing can involve inspection of shell eggs for defects which could affect marketability of their contents. Such defects might include, for example, excessive dirt on the shells and cracked shells, which may cause present or subsequent contamination of the contents of the shell eggs.

Commercial egg processors commonly sell the contents of the shell eggs, i.e., yolk and albumen (egg whites), separately. Although blended yolks and albumen can be sold as "whole" egg, that form generally brings lower prices than when the yolks and albumen are sold separately. Egg contents are generally subjected to relatively stringent standards for purity and wholesomeness. Thus, egg processing operations often involve defect detection procedures for minimizing or eliminating defects which might jeopardize meeting those standards.

Commercial egg processing is often done with various types of automated equipment, such as an egg breaking and contents separating machine as taught by Willsey, U.S. Pat. No. 4,321,864. Such equipment can include a number of shell egg cracking and separating units (sometimes referred to as "crackers"), linked together in an endless belt Or chain which can be driven through various stations whereat the shell eggs are cracked, the shell halves spread apart, the shell egg contents drained, and the yolk and albumen portions thereof separated for discharge into selected receptacles at a downstream location. If a shell egg remains soiled after being processed through a washer, the cracking process may cause some of that soilage to intermix with and contaminate the egg contents. Preferably, only clean eggs are processed through the crackers.

Procedures for detecting defective shell eggs sometimes involve stationing an operator at an observation station downstream from a station where the shell eggs are washed such that the operator can visually inspect and screen the stream of shell eggs prior to processing thereof.

When a defective shell egg is detected, the operator can physically remove the shell eggs or adjust the apparatus such that the defective shell eggs are sorted out for rerouting through the washer. However, such sorting and screening techniques are susceptible to human error since they depend primarily upon visual observation by the operator. The human error factors can be exacerbated by the repetition and tedium associated with constantly observing a fast-moving procession of objects which are nearly identical in appearance while trying to remain alert for the telltale signs of a defect.

Therefore, there is a need for a shell egg culling system for automatically culling out cracked eggs for discarding and, further, for culling out soiled eggs from clean eggs for recycling through a washer. Therefore, an effective automatic culling system and method can reduce an operator's workload and improve productivity. The present invention addresses this need.

SUMMARY OF THE INVENTION

An improved shell egg culling system is provided for automatically detecting and culling shell eggs having broken shells and shell eggs having soiled shells from shell eggs having clean, unbroken shells. The system generally includes a first conveyor and a second conveyor having sites for transporting shell eggs; detecting means for detecting shell eggs which, in conjunction with a computer, designate which of the sites contain shell eggs having broken shells and which contain shell eggs having soiled shells; a first removing means for removing shell eggs having broken shells from the first conveyor; and a second removing means for removing shell eggs having soiled shells.

As shell eggs are conveyed by the first conveyor, an illuminator illuminates several rows of the shell eggs and a video camera scans light reflected by the shell eggs. The shell eggs rotate about generally horizontal, transverse axes as they are conveyed such that most of the outer surfaces of the shell eggs, except for opposing ends about respective axes, are multiply scanned for breakage and for soilage.

Data generated from light reflected by each of the shell eggs being scanned are separately compared with a first algorithm and a second algorithm stored in the computer. If the data from one of the shell eggs favorably compare with the first algorithm, the site containing that shell egg is characterized as containing a shell egg having a broken shell. Similarly, if data from one of the shell eggs favorably compare with the second algorithm, the site containing that shell egg is characterized as containing a shell egg having a soiled shell. The computer keeps track of the location of the sites, as they are conveyed along, by a proximity switch interacting with the first conveyor.

The computer controls a plurality of bridges, which are included in the first removing means and which are arranged in side-by-side relationship, such that as the sites of the first conveyor cascade Over an end sprocket, the bridges, which are adjacent to sites which have been characterized as containing shell eggs having broken shells, are elevated such that the respective shell eggs fall to an auger therebelow for discarding.

Similarly, the bridges, which are adjacent to sites which have not been characterized as Containing shell eggs having broken shells, are not elevated such that the respective shell eggs roll therealong. A paddle wheel sweeps those shell eggs into the sites of the second conveyor.

A movable platform have downwardly directed lifters, which are included in the second removing means and which are arrayed in a matrix arrangement, such that the sites of the second conveyor move therebeneath. The lifters are spaced to correspond to the sites of the second conveyor. As the platform is lowered such that the lifters contact respective shell eggs in the sites therebelow, the lifters corresponding to the sites which have been characterized as containing shell eggs having soiled shells, are suction-activated. The platform is then elevated, lifting those shell eggs from the second conveyor and displacing them transversely where the shell eggs having soiled shells are released to a return conveyor for recycling through a washer.

PRINCIPAL OBJECTS AND ADVANTAGES OF THE INVENTION

The principal objects and advantages of the present invention are: providing a system for automatically detecting and culling shell eggs having broken shells from shell eggs having unbroken shells; providing such a system for automatically detecting and culling shell eggs having clean shells from shell eggs having soiled shells; providing such a system wherein the shell eggs are inspected by a video system; providing such a system wherein video signals corresponding to the discrete objects are converted to data and compared to predetermined values for various attributes; providing such a system which utilizes a microprocessor for control and data manipulation; providing such a system which automatically calibrates itself relative to the average characteristics of each shell egg; providing such a system which can calibrate itself automatically to adjust for changing conditions in the discrete objects and in its surroundings; providing such a system which is adapted for use with an egg breaking and contents separating machine; providing such a system which can reduce some of the labor requirements associated with shell egg processing procedures, and particularly the "broken egg" or "soiled egg" inspection procedures associated therewith; and providing such a system which is economical to manufacture, efficient in operation, capable of a long operating life and particularly well adapted for the proposed usage thereof.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, top plan and partially schematic view of a shell egg culling apparatus embodying the present invention, shown in combination with an egg breaking and contents separating machine.

FIG. 2 is an enlarged, fragmentary, top plan view of the shell egg culling apparatus, with portions cut away to reveal details thereof.

FIG. 3 is an enlarged, fragmentary, vertical, side elevational view of the shell egg culling apparatus, taken generally along line 3—3 of FIG. 1, showing a discard door in a retaining configuration in solid lines and in a discarding configuration in phantom lines.

FIG. 4 is an enlarged, fragmentary, side elevational view of the shell egg culling apparatus, taken generally along line 4—4 of FIG. 1, showing a row of egg lifters spaced above a respective row of eggs.

FIG. 5 is an enlarged, fragmentary, side elevational view of a portion of the shell egg culling apparatus, showing a pair of the egg lifters in a lifting configuration in solid lines and in a transporting configuration in phantom lines.

DETAILED DESCRIPTION OF THE INVENTION

I. Introduction and Environment

Figure 6:
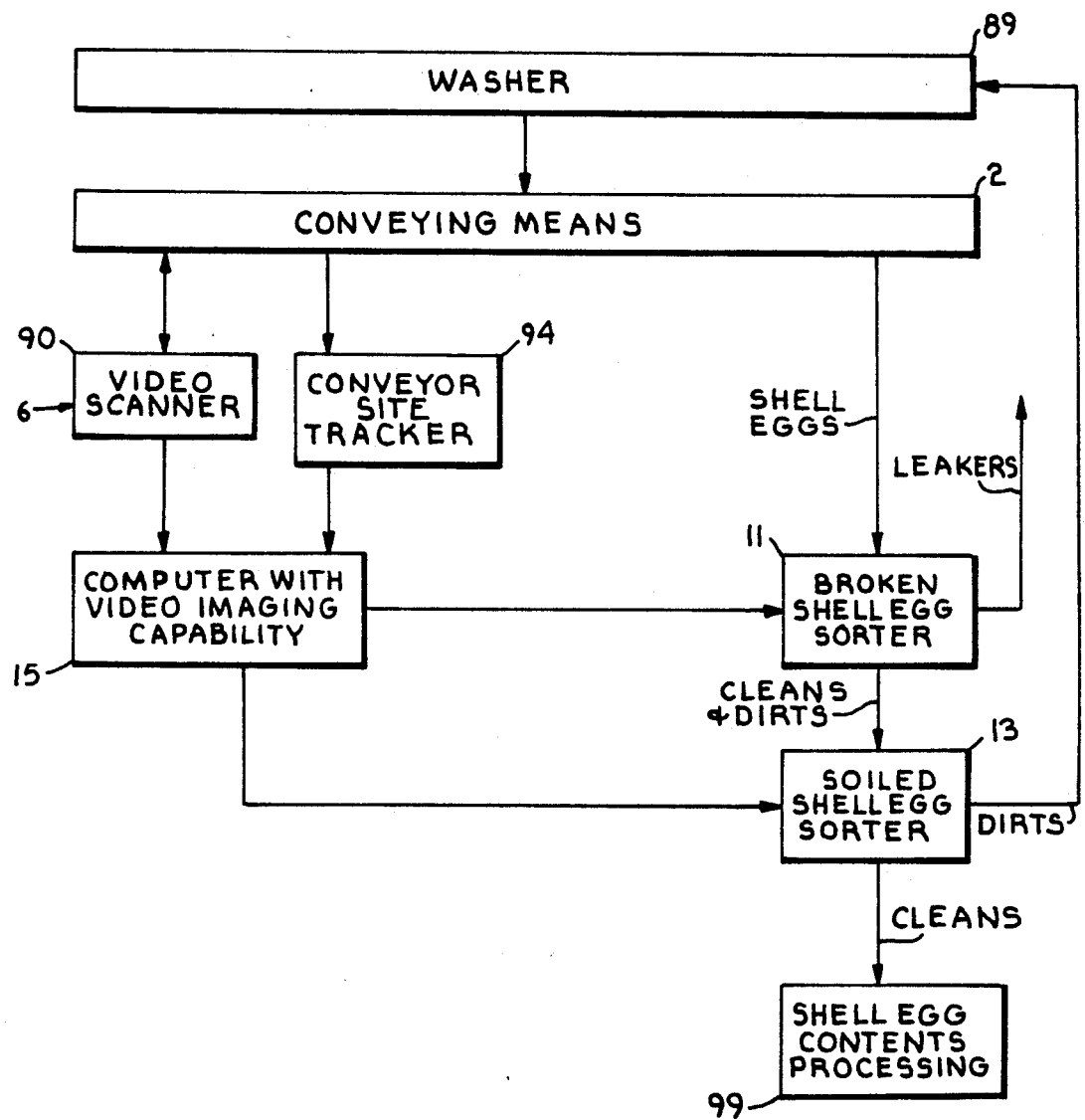
FIG. 6 is a schematic diagram of the shell egg culling apparatus, according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a shell egg culling system in accordance with the present invention, as shown in FIGS. 1 through 6. The apparatus 1 includes conveying means 2 such as a first conveyor 3 and a second conveyor 5, detecting means 6, culling means such as a first removing means or broken shell egg sorter 11 (FIG. 3) and a second removing means or soiled shell egg sorter 13 (FIGS. 1 and 5), and controlling means such as a computer 15 (FIGS. 1 and 6), or the like.

The first conveyor 3 includes a continuous belt or chain 17 (FIG. 3) of interconnected rollers 19 which are arranged in adjacently spaced rows 20 such that the rollers 19 in one of the rows 20, e.g., row 21 as shown in FIG. 2, in conjunction with the immediately following row 20, e.g., row 22 as also shown in FIG. 2, form a row of sites 23 therebetween, each of which can cradle and transport one of the shell eggs 25 at a time. The first conveyor 3 has a generally horizontal, upper run 26 (FIG. 3) and a lower, return run (not shown).

Similarly, the second conveyor 5 includes a continuous belt or chain 29 comprising adjacently spaced rows 30 of rollers 31 forming a row 35 of sites 36 therebetween, each of which can cradle and transport one of the shell eggs 25. The second conveyor 5 may be a continuation of the first conveyor 3, with a portion thereof, as designated by the numeral 37 in FIG. 3, being spaced therefrom such that a gap 39 is formed between the first conveyor 3 and the second conveyor 5.

The rollers 19 are generally mounted such that the rollers 19 all rotate in the same direction, such as counterclockwise as shown by the arrows designated by the numeral 41 in FIG. 3. As a result, each of the shell eggs 25 is caused to rotate about a generally horizontal, transverse axis as indicated by the arrow designated by the numeral 42 in FIG. 2.

The first removing means 11 includes a plurality of bridges 43 arranged in side-by-side relationship such that each of the bridges 43 is generally aligned with a respective one of the sites 23 in the first conveyor 3, as the sites 23 are poised to cascade downwardly over a sprocket 45, such as those designated by the numeral 44 in FIG. 2, such that each of the shell eggs 25 therein, such as the shell egg 25 designated by the numeral 46 in FIG. 2, roll along a respective one of the bridges 43 as the respective bridge 43 is in a first or non-discard configuration, as designated by the numeral 47 and as shown in solid lines in FIG. 3. Each of the bridges 43 is pivotally mounted about a generally horizontal, transverse axle 49 as shown in FIG. 2.

The first removing means 11 also includes an activating means, such as a pneumatic piston arrangement 51, whereby each one of the bridges 43 can be individually pivoted about the axle 49 to a second or discard configuration, as designated by the numeral 53 and as shown in phantom lines in FIG. 3.

A guide plate 55 is spaced to cooperatively receive the shell eggs 25 which are transferred thereto by the bridges 43 as the bridges 43 are in the non-discard configuration 47. A paddle wheel 57 with fins 59 rotates about an axle 61, clockwise as shown in FIG. 3, and is coordinated with the second conveyor 5 such that the shell eggs 25 received by the guide plate 55 are urged into respective ones of the rows 35 of the sites 36 of the second conveyor 5.

As selected ones of the bridges 43 are in the discard configuration 53, respective ones of the shell eggs 25, which tumble from the first conveyor 23 as respective ones of the sites 44 cascade over the sprocket 45, are gravitationally received by discard means, such as an underlying auger 63, which carries those shell eggs 25 away for discarding, or the like.

The second removing means 13 includes a platform 65, which is generally suspended above the second conveyor 5 such that the shell eggs 25 contained in the sites 36 can pass therebelow. The platform 65 has a plurality of suction cups or lifters 67 extending downwardly therefrom and are arranged in a plurality of adjacently spaced rows 69 in a matrix-type formation.

The number of the lifters 67 in each of the rows 69 is equal to the number of the sites 36 in each of the rows 35 of the second conveyor 5. The spacing between the rows 69 is substantially identical to the spacing between the rows 35 of the second conveyor 5. In other words, the lifters 67 extending downwardly from the platform 65 correspond on a one-to-one basis with the sites 36 contained in a set 70 containing a plurality of adjacently spaced rows 35. The set 70 illustrated in FIGS. 3 and 4 shows six of the lifters 67 in each of four of the rows 69, adjacently spaced.

The platform 65 is suspended from a track 71 by a spacer 73. Elevating means, such as a solenoid 75 in conjunction with the spacer 73, provides the ability to lower the platform 65, such that it is displaced downwardly as indicated by the arrow designated by the numeral 77 in FIG. 4, whereby the lifters 67 contact the shell eggs 25 being conveyed therebelow by the conveyor 5, as shown in solid lines in FIG. 5.

Each of the lifters 67 has an opening in a lower end 79 thereof which is in fluid or pneumatic communication with one of a plurality of tubes 81. Each Of the tubes 81 is connected to one of a plurality of remotely controlled valves (not shown) which, in turn, is connected to a low-vacuum pump which is capable, in conjunction with the lifters 69, to lift selected ones of the shell eggs 25 upwardly from the second conveyor 5, such as the soiled shell egg 25 designated by the numeral 85 in FIGS. 4 and 5.

Driving means 83, such as a chain and sprocket or other suitable mechanism commonly known in the art, displace the platform 65 along the track 71 from a position above the second conveyor 5 to a position to one side of the conveyor 5, as indicated by the arrow designated by the numeral 85 in FIG. 5 whereat the shell eggs 25 transported by the lifters 69 are released to a return conveyor 87 for transporting them back to a washer 89 (FIG. 6), which is generally positioned upstream from the first conveyor 3.

It is to be understood that the first removing means 11 and the second removing means 13 can concurrently operate in conjunction with the first conveyor 3, rather than associating the first removing means 11 with the first conveyor 3 and the second removing means 13 with the second conveyor 5 as hereinbefore described.

The detecting means 6 generally includes a video scanner 90 (FIG. 6) including an illuminator 91 (FIG. 1) and a receiver or video camera 93 connected to the computer 15. The illuminator 91 is adapted to illuminate a plurality of the rows 20 of the shell eggs 25 as they are conveyed by the first conveyor 3. For example, the illuminator 91 could illuminate eight of the rows 20, each containing six of the shell eggs 25, for a total of forty-eight of the shell eggs 25.

The video camera 93 is adapted to scan the shell eggs 25 which are illuminated as hereinbefore described, such as by standard television-type technology commonly known in the art, whereby the camera 93 views sixty fields per second to create thirty frames per second, or the like. Those frames are then communicated to the computer 15.

The computer 15 contains video imaging capability, such as a frame grabber or a high-resolution image processor with real-time processing as provided by Imaging Technology, Inc., or the like, for separately analyzing selected optical characteristics reflected by each of the shell eggs 25 occupying the sites 23 as they are illuminated by the illuminator 91. For example, one of the shell eggs 25 having a broken shell, such that albumen thereof is disposed on the surface thereof, has a distorted video image. Data stored by the computer 15 for each of the sites 23 being analyzed are originally initialized to correspond to one of the shell eggs 25 having a clean, unbroken shell.

The computer 15 also contains a first algorithm corresponding to optical characteristics arising from one of the shell eggs 25 having a broken shell, sometimes hereinafter referred to as a "leaker", and a second algorithm corresponding to optical characteristics arising from one of the shell eggs 25 having an unclean shell, sometimes hereinafter referred to as a "dirt".

The computer 15 is adapted such that the data received from the camera 93 for each of the shell eggs 25 in the illuminated sites 23 can be separately compared with the first algorithm and the second algorithm. If the data for a particular one of the shell eggs 25 identifies with the first algorithm, the computer 15 automatically characterizes that site 23 as containing a leaker.

Similarly, if the data for a particular one of the shell eggs 25 identifies with the second algorithm, the computer 15 automatically characterizes that site 23 as containing a dirt. The sites 23 which have not been characterized as containing leakers or dirts are identified by the computer 15 as containing those of the shell eggs 25 which have clean, unbroken shells, sometimes hereinafter referred to as "cleans".

A location identifier or conveyor site tracker 94, such as a reed switch, a photoelectric switch, or the like, functioning as a proximity switch, is periodically triggered to update the computer 15 as to the location of each of the sites 23 relative to each of the first removing means 11 and the second removing means 13 as the shell eggs 25 advance predetermined incremental spacings by the first conveyor 3 and the second conveyor 5.

II. Application

In an application of the present invention, a plurality of the shell eggs 25 are processed through the washer 89 and are subsequently positioned in the sites 23 contained in the upper run 26 of the first conveyor 3. The illuminator 91 illuminates a plurality of the rows of the shell eggs 25 as they are transported therealong.

As the shell eggs 25 traverse the field of view of the camera 93, each of the shell eggs 25 rotates about its axis 42, generally exposing, except for opposing ends 95 as indicated in FIG. 2, the entire surface 96 thereof to the scrutiny of the camera 93. Each of the shell eggs 25 is multiply scanned as they rotate, with leaker and dirt characterizations of the shell eggs 25 contained in each of the sites 23 being constantly updated and stored by the computer 15.

The fact that the conditions of the ends 95 are not included in the scanning is only of minimal importance in that the ends 95 are relatively remote from egg breaking procedures which normally occur near an equator 97 (FIG. 2) of each of the shell eggs 25 during subsequent egg contents processing 98.

The reflected illumination received from the shell eggs 25 by the video camera 93 and the data resulting therefrom is communicated to and processed by the computer 15 for comparison of the data received from each of the sites 23 with the first algorithm and the second algorithm stored in the computer 15. Those sites 23 containing certain of the shell eggs 25 which reflect illumination corresponding to the first algorithm are flagged by the computer 15 as containing leakers. Similarly, those sites 23 containing certain of the shell eggs 25 which reflect illumination corresponding to the second algorithm are flagged by the computer 15 as containing dirts.

Just before a particular row of the sites 23, such as the sites 44, cascades over the sprocket 45, the computer 15 causes certain of the bridges 43, corresponding to those sites 44 flagged by the computer 15 as containing leakers, to be elevated as indicated by the numeral 53 in FIG. 3, such that the leakers gravitationally drop into the auger 63 for disposal. The bridges 43 corresponding to the sites 44, containing the shell eggs 25 which were not identified as leakers, are not elevated, as indicated by the numeral 47 in FIG. 3, such that corresponding ones of the shell eggs 25, as indicated by the numeral 46 in FIG. 2, travel along the respective, slightly downwardly sloping bridges 43 to be received by the guide plate 55. The rotating fins 59 of the paddle wheel 57 urge the shell eggs 25 from the guide plate 55 into respective ones of the sites 36 of the second conveyor 5.

As the shell eggs 25 are transported beneath the platform 65, the platform 65 cooperatively drops downwardly such that the lifters 67 contact successive sets of the shell eggs 25 therebelow. The lifters 67 which contact the shell eggs 25 which are contained in the sites 36 flagged by the computer 15 as containing dirts are remotely activated such that a partial vacuum is created within corresponding ones of the lifters 67.

As the solenoid 75 is reactivated, the dirts are hoisted upwardly with the platform, as indicated by the arrow designated by the numeral 98 in FIG. 5. The platform 65 is then displaced to one side of the second conveyor 5, as indicated by the arrow designated by the numeral 86 in FIG. 5, and the dirts are released to the return conveyor 87 which returns the dirts to the washer 89 for rewashing and reconveying along the conveying means 2 to repeat the culling cycle of the present invention.

The cycle time for the platform 65 to pick up dirts and transport them to the return conveyor 87, then return to the second conveyor 5 for more dirts is coordinated with the linear speed of the second conveyor 5.

The shell eggs 25 which have not been designated as leakers or dirts, after being processed through the first removing means 11 and the second removing means 13, remain on the second conveyor 5 for transferring into the egg contents processing apparatus 99 (FIG. 6), which generally includes a cracking station and other associated equipment and operations.

It is to be understood that while certain forms of the present invention have been illustrated and described herein, it is not to be limited to the specific forms or arrangement of parts described and shown.

What is claimed and desired to be secured by Letters Patent is as follows:

1. An egg culling apparatus for culling shell eggs having broken shells and shell eggs having unclean shells from shell eggs having clean, unbroken shells after the shell eggs have been processed through a washer, comprising:
   (a) conveying means for conveying the shell eggs from the washer, said conveying means including a conveyor having multiple sites, each adapted to hold one of the shell eggs; said sites arranged in a side-by-side relationship in adjacent rows; said conveying means rotating each of the shell eggs about a generally horizontal, transverse axis;
   (b) detecting means for automatically detecting the shell eggs having broken shells and the shell eggs having unclean shells as the shell eggs are conveyed by said conveying means;
   (c) culling means for automatically and separately culling the shell eggs detected as having broken shells and the shell eggs detected as having unclean shells from the shell eggs having clean, unbroken shells as the shell eggs are conveyed by said conveying means; and
   (d) controlling means for interconnecting said detecting means and said culling means.

2. The egg culling apparatus according to claim 1, wherein:
   (a) the number of said sites in each of said rows is six.

3. The egg culling apparatus according to claim 1, wherein:
   (a) said culling means includes:
      (1) first removing means for removing the shell eggs having broken shells; and
      (2) second removing means for removing the shell eggs having unclean shells.

4. The egg culling apparatus according to claim 3, wherein:
   (a) said conveying means includes:
      (1) a first conveyor for conveying the shell eggs from the washer to said first removing means; and
      (2) a second conveyor for conveying the shell eggs having unbroken shells from said first removing means to said second removing means.

5. The egg culling apparatus according to claim 3, wherein:
   (a) said controlling means includes a computer.

6. The egg culling apparatus according to claim 3, wherein:
   (a) said first removing means gravitationally removes the shell eggs having broken shells.

7. The egg culling apparatus according to claim 3, wherein:

(a) said second removing means pneumatically removes the shell eggs having unclean shells.

8. The egg culling apparatus according to claim 1, wherein:
(a) said detecting means includes:
(1) an illuminator adapted to illuminate a plurality of said rows of the shell eggs as the shell eggs are conveyed by said conveying means; and
(2) an optical receiver adapted to separately:
(i) receive portions of said illumination reflected by respective ones of said shell eggs; and
(ii) generate sorting data therefrom;
(b) said controlling means include a first algorithm corresponding to data arising from a shell egg having a broken shell, and a second algorithm corresponding to data arising from a shell egg having an unclean shell; and
(c) said controlling means adapted to characterize certain ones of said sites as containing shell eggs having broken shells and certain other ones of said sites as containing shell eggs having unclean shells by comparing said sorting data from each of said sites generated by said optical receiver with said first algorithm and said second algorithm; said controlling means adapted to retain said characterization for each said site as the respective shell eggs are conveyed through said culling means.

9. An egg culling apparatus for culling shell eggs having broken shells and shell eggs having unclean shells from shell eggs having clean, unbroken shells after the shell eggs have been processed through a washer, comprising:
(a) conveying means for conveying the shell eggs from the washer;
(b) detecting means for automatically detecting the shell eggs having broken shells and the shell eggs having unclean shells as the shell eggs are conveyed by said conveying means;
(c) culling means for automatically and separately culling the shell eggs detected as having broken shells and the shell eggs detected as having unclean shells from the shell eggs having clean, unbroken shells as the shell eggs are conveyed by said conveying means, said culling means including:
(1) first removing means for removing the shell eggs having broken shells and including a plurality of pivotally mounted bridges in a generally side-by-side relationship, one for each of said sites in one of said rows; and
(2) second removing means for removing the shell eggs having unclean shells; and
(d) controlling means for interconnecting said detecting means and said culling means, each of said bridges of said first removing means being separately controlled by said controlling means.

10. The egg culling apparatus according to claim 9, including:
(a) an auger for receiving the shell eggs removed by said first removing means.

11. An egg culling apparatus for culling shell eggs having broken shells and shell eggs having unclean shells from shell eggs having clean, unbroken shells after the shell eggs have been processed through a washer, comprising:
(a) conveying means for conveying the shell eggs from the washer;
(b) detecting means for automatically detecting the shell eggs having broken shells and the shell eggs having unclean shells as the shell eggs are conveyed by said conveying means;
(c) culling means for automatically and separately culling the shell eggs detected as having broken shells and the shell eggs detected as having unclean shells from the shell eggs having clean, unbroken shells as the shell eggs are conveyed by said conveying means said culling means including:
(1) first removing means for removing the shell eggs having broken shells; and
(2) second removing means for removing the shell eggs having unclean shells and including:
(i) a platform spaced generally above a portion of said conveying means; said platform adapted to oscillate generally transversely relative to said conveying means; and
(ii) a plurality of lifters arranged in a matrix, one for each of said sites in a predetermined number of said rows; said lifters suspended from said platform; and
(d) controlling means for interconnecting said detecting means and said culling means, each of said lifters being separately controlled by said controlling means.

12. The egg culling apparatus according to claim 11, including:
(a) a return conveyor for receiving the shell eggs removed by said second removing means and for returning same to the washer.

13. The egg culling apparatus according to claim 11, wherein:
(a) said platform and said conveying means are coordinated such that said platform completes one of said oscillations as said conveying means travels a distance equivalent to said predetermined number of said rows.

14. A shell egg culling apparatus for culling shell eggs having broken shells and shell eggs having soiled shells from shell eggs having clean, unbroken shells after the shell eggs have been processed through a shell egg washer, comprising:
(a) a culling conveyor having a plurality of adjacently spaced rows, each comprising a plurality of sites in side-by-side relationship with each of said sites adapted to transport one of the shell eggs; said culling conveyor adapted to rotate each of the shell eggs contained in said sites about a respective, generally horizontal, transverse axis; said culling conveyor having a first conveyor portion and a second conveyor portion; said culling conveyor configured such that said first conveyor portion and said second conveyor portion are generally spaced apart such that a gap is formed between said first conveyor portion and said second conveyor portion; said first conveyor portion and said second conveyor portion are generally aligned such that said sites contained in said first conveyor portion are respectively aligned with said sites contained in said second conveyor portion;
(b) a conveyor site tracker adapted to cooperate with said conveyor such that the locations of said rows of sites of said first conveyor portion and said second conveyor portion are tracked;
(c) a video scanner including:
(1) an illuminator adapted to repeatedly illuminate the shell eggs contained in a plurality of said rows of said sites with optical radiation as the shell eggs are conveyed by said first conveyor portion; and (2) an optical receiver adapted to receive portions of said optical radiation reflected by respective ones of said shell eggs so repeatedly illuminated; said reflected radiation coordinated with each of said sites containing respective ones of the shell eggs; said receiver adapted to convert reflected radiation into electronic data;

(d) a computer adapted to receive said electronic data from said optical receiver; said computer, in cooperation with said conveyor site tracker, adapted to coordinate said electronic data with respective ones of said sites containing the shell eggs providing said reflected radiation generating respective said electronic data; said computer containing a first algorithm corresponding to electronic data generated by reflected optical radiation received from a broken shell egg and a second algorithm corresponding to electronic data generated by reflected optical radiation received from a soiled shell egg; said computer adapted to identify respective sites containing broken shell eggs and soiled shell eggs by comparing electronic data generated from optical radiation received from the respective shell eggs being conveyed by said first conveyor portion with said first algorithm and said second algorithm;

(e) a broken shell egg sorter having a plurality of bridges, one for each of said sites in one of said rows of sites; said bridges spaced in side-by-side relationship and aligned with respective said sites; each of said bridges having a first configuration adapted to generally span said gap between said first conveyor portion and said second conveyor portion such that certain ones of the shell eggs are selectively allowed to pass from said first conveyor portion to said second conveyor portion and a second configuration adapted to selectively sort out shell eggs contained in said sites which have been identified by said computer as containing broken shell eggs; said bridges connected to said computer such that said first configuration and said second configuration of each of said bridges is separately selectable by said computer;

(f) an auger for receiving shell eggs from said broken shell egg sorter;

(g) a soiled shell egg sorter having:

(1) a platform spaced generally above said second conveyor portion; said platform having a plurality of lifters arranged in a matrix, with one of said lifters corresponding to each of said sites in a predetermined number of said rows of sites in said second conveyor portion; said lifters extending downwardly from said platform; said platform having a first configuration adapted to allow the shell eggs to continue unhindered along said second conveyor portion and a second configuration adapted to selectively sort out shell eggs contained in said sites which have been identified by said computer as containing soiled shell eggs; said lifters separately connected to a partial vacuum source controlled by said computer such that said soiled shell eggs are vertically removable from said second conveyor portion as said platform is in said second configuration; and (2) a track adapted to suspend said platform above said second conveyor portion, to selectively raise and lower said platform from and to said first configuration and said second configuration, and to transversely displace said platform from above said second conveyor portion to one side of said second conveyor portion; and (h) a return conveyor for receiving the soiled shell eggs from said soiled shell egg sorter; said return conveyor adapted to return the soiled shell eggs to the washer.

15. A method of culling shell eggs having broken shells and shell eggs having unclean shells from shell eggs having clean, unbroken shells after the shell eggs have been processed through a washer, comprising the steps of:

(a) providing an apparatus having conveying means, detecting means, culling means, and controlling means for interconnecting said detecting means and said culling means;

(b) positioning the shell eggs in side-by-side relationship in adjacent rows on said conveying means;

(c) conveying the shell eggs from the washer by the conveying means while maintaining said side-by-side relationship in said adjacent rows;

(d) rotating each of the shell eggs about a generally horizontal transverse axis during said conveying;

(e) automatically detecting the shell eggs having broken shells and the shell eggs having unclean shells as the shell eggs are conveyed by said conveying means; and (f) automatically and separately culling the shell eggs having broken shells and the shell eggs having unclean shells from the shell eggs having clean, unbroken shells with said controlling means as the shell eggs are conveyed by said conveying means.

16. The method according to claim 15, including the steps of:

(a) providing a culling means having a first removing means and a second removing means;

(b) removing the shell eggs having broken shells with said first removing means; and (c) removing the shell eggs having unclean shells with said second removing means.

17. The method according to claim 16, wherein:

(a) said first removing means gravitationally removes the shell eggs having broken shells.

18. The method according to claim 16, wherein:

(a) said second removing means pneumatically removes the shell eggs having unclean shells.

19. The method according to claim 16, including the steps of:

(a) automatically returning the shell eggs removed by said second removing means to the washer;

(b) rewashing the shell eggs returned to the washer; and (c) reconveying the re-washed shell eggs through said apparatus.

20. The method according to claim 15, including the steps of:

(a) providing detecting means having an illuminator and an optical receiver; further providing controlling means having a first algorithm corresponding to data arising from a shell egg having a broken shell and a second algorithm corresponding to data arising from a shell egg having an unclean shell;

(b) illuminating a plurality of the shell eggs as the shell eggs are conveyed by said conveying means;

(c) receiving portions of said illumination reflected from said shell eggs and generating data therefrom; and (d) identifying the shell eggs having broken shells and the shell eggs having unclean shells by comparing said data with said first algorithm and said second algorithm.

* * * * *